United States Patent [19]

Yamauchi et al.

[11] 3,899,773

[45] Aug. 12, 1975

[54] REMOTE CONTROL SIGNAL GENERATOR WHICH OPERATES TO INDIVIDUALLY CONTROL A PLURALITY OF CONTROLLED CIRCUITS

[75] Inventors: Seizo Yamauchi; Kazuo Shimomura, both of Osaka, Japan

[73] Assignee: Sanyo Electric Company, Ltd., Osaka, Japan

[22] Filed: Feb. 9, 1973

[21] Appl. No.: 331,019

[30] Foreign Application Priority Data

| | | |
|---|---|---|
| Feb. 10, 1972 | Japan | 47-14425 |
| Feb. 10, 1972 | Japan | 47-14426 |
| Feb. 10, 1972 | Japan | 47-14427 |
| Feb. 10, 1972 | Japan | 47-14428 |
| Feb. 16, 1972 | Japan | 47-16642 |
| June 14, 1972 | Japan | 47-59793 |

[52] U.S. Cl. .......... 340/167 R; 340/168 R

[51] Int. Cl. .......... H04q 5/00

[58] Field of Search .......... 340/163, 167 R, 164 R, 340/168 R, 151, 365 R, 365 C, 359; 343/228, 227, 225; 179/90 B, 90 BD, 90 K

[56] References Cited

UNITED STATES PATENTS

| | | | |
|---|---|---|---|
| 3,555,201 | 1/1971 | Kuehnle | 179/90 BD |
| 3,631,398 | 12/1971 | Houghton | 340/168 R |
| 3,651,469 | 3/1972 | Keese | 340/168 R |
| 3,748,645 | 7/1973 | Kawashima | 340/168 R |

*Primary Examiner*—Harold Pitts
*Attorney, Agent, or Firm*—Armstrong, Nikaido & Wegner

[57] ABSTRACT

A remote control signal generator for individually controlling one of a plurality of control circuits. A selected switch operates a clock pulse generator having a predetermined number of pulse outputs in accordance with the switch which is selected. Counting means are provided for stopping the clock pulse generator after a period of time corresponding to the switch selection.

19 Claims, 43 Drawing Figures

REMOTE CONTROL SIGNAL GENERATOR WHICH OPERATES TO INDIVIDUALLY CONTROL A PLURALITY OF CONTROLLED CIRCUITS

BACKGROUND OF THE INVENTION

1. Field of the Invention

The present invention is related to a remote control signal generator which operates in a manner so as to individually control a plurality of circuits and more particularly to a signal generator which is used as a remote control for individually controlling the separate channels of a television receiver.

2. Description of the Prior Art

In the field of a remote control relating to television receivers the prior art devices relate to a remote control signal generator which transmits a signal or combination signals in the form of ultrasonic wave and the like to a television receiver in which the received signals activate a motor for channel selection. The operator of the channel selector continuously monitors the signal in order to select the desired channel, and he must stop the selection process so as to maintain the proper channel balance.

BRIEF SUMMARY OF THE INVENTION

It is therefore a primary object of the present invention to provide a signal generator for remote control of a device which operates in a manner so as to individually control the selection of one among a plurality of circuits.

It is another object of the present invention to provide a remote control signal generator which individually controls the selection of one among a plurality of circuits which generates remote controlling signals in pulse train form.

It is still another object of the present invention to provide a remote control signal generator which individually selects one among a plurality of circuits which generates continuous remote controlling signals for a predetermined period.

It is a further object of the present invention to provide a remote control signal generator which individually controls the selection of one among a plurality of circuits which is free from deleterious effect caused by chattering noises during transient periods which occur after activating and deactivating the control.

It is still a further object of the present invention to provide a remote control signal generator which individually controls the selection of one among a plurality of circuits and substantially is free of malfunction.

BRIEF DESCRIPTION OF THE DRAWINGS

These and other objects of the invention will be more fully understood from the following description taken in conjunction with the drawings wherein like numbers are used for like parts and wherein.

DETAILED DESCRIPTION

The following description is specifically referring to the use of the present invention in relation to the control of a television receiver. However, the invention is not to be limited to a particular type of receiver.

Before proceeding further, the term "remote control device which individually controls the selection of one among a plurality of circuits" is specifically defined relative to the following description as a remote control which operates in a manner as to be capable of sending the same numbers of independent signals as there are numbers of available television broadcasting channels.

For instance, a first controlling signal "*a*" may be transmitted to the television set for controlling the channel selector of the set so as to tune in the desired broadcasting channel A. In the same manner, another controlling signal "*b*" may be transmitted to the set for controlling the channel selector so as to tune in another desired broadcasting channel B. In general, each controlling signal corresponds to a specified broadcasting channel thereby providing independent selection among the plurality of channels.

Concerning controlling signals, two embodiments will be disclosed hereinafter, one of which is a signal having a discontinuous predetermined number of pulses and the other a signal having a continuous wave for a predetermined period of time.

In the application, the first unit pulse received at the remote controlled set is used for resetting the channel selector or a tuner to a standard channel, and then the channel selector is adjusted so as to tune in the desired channel in predetermined order of the number of pulses received.

For example, assume that the third switch of the signal generator corresponding to the third selectable channel of the set is pressed to transmit remote control signals including three pulses.

The first pulse out of the three pulses would reset the channel selector to a standard channel such as the first channel and the following two pulses would shift the channel selector to the second channel and then to the third channel in that order.

Since the entire shifting operation is completed in a very short time, it visually appears as if channel three were selected simultaneously with the manual pressing operation of the third switch of the signal generator.

The channel selecting process in the set is different in the operation wherein continuous pulses of predetermined relatively long signals are used.

In this case, the counted value of the continuous pulses is converted into a proportional DC voltage which controls the capacity of a variable capacitor or some other variable impedance element. Such a control may be a tuning circuit installed in the channel selector.

Figure 1:
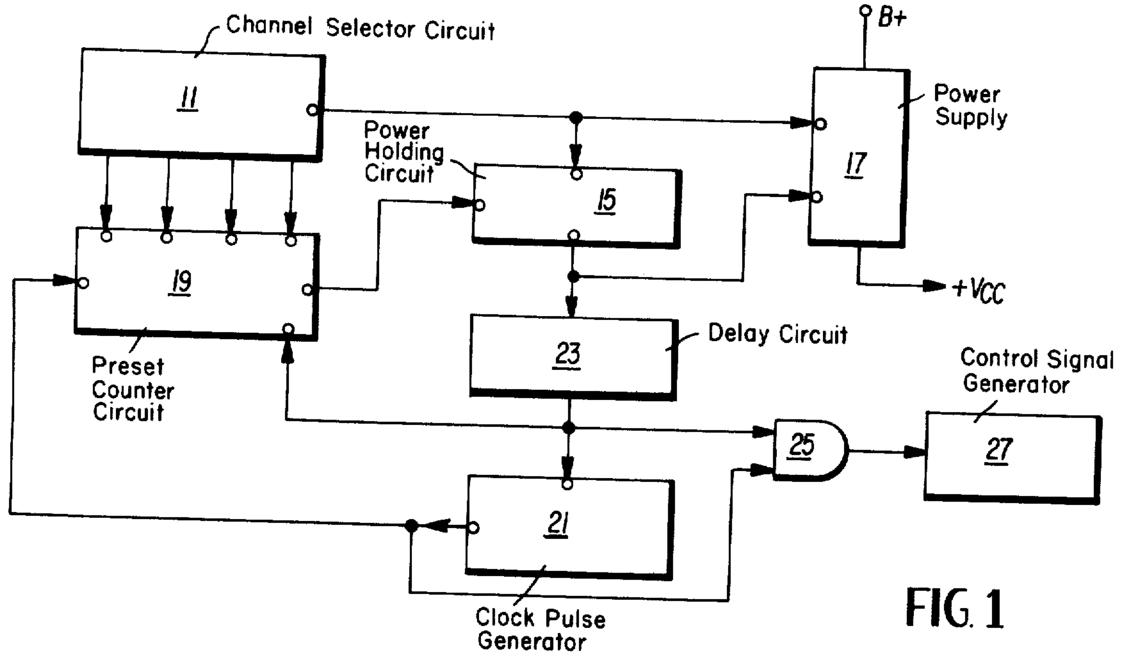
FIG. 1 is a schematic block diagram of one embodiment of the present invention.
Figure 2:
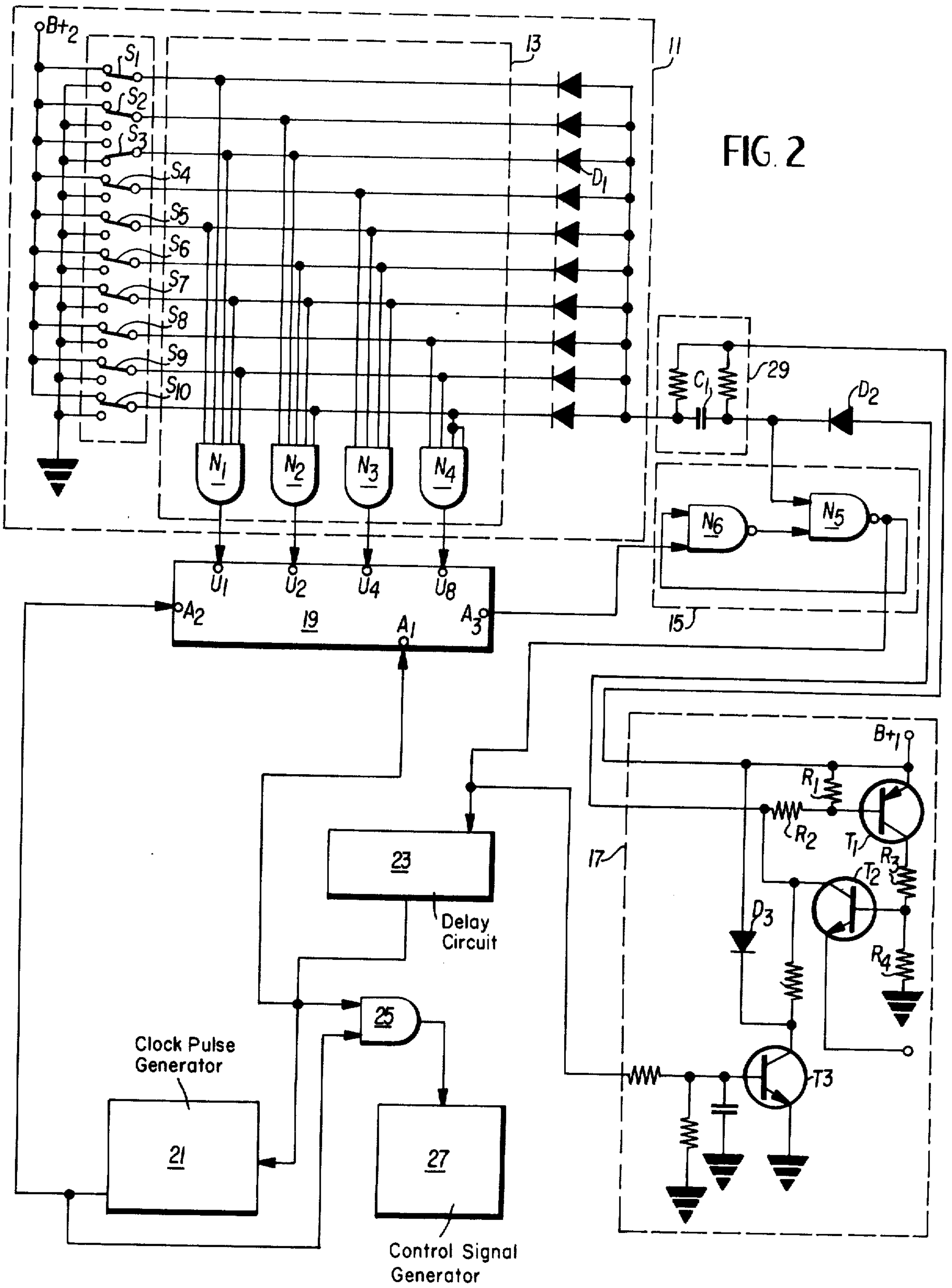
FIG. 2 is a schematic circuit diagram of the device shown in FIG. 1.

Referring now particularly to FIGS. 1 and 2, which show fundamental block and circuit diagrams, a channel selector circuit 11 includes channel selecting switches S1, S2, S3 - - - S10, each of which correspond to a selectable broadcasting channel in a television receiving set which is to be tuned in remotely and a decimal-binary converting Matrix circuit 13. The selector circuit functions so as to produce indicating signals to activate the power holding circuit 15 and power supplying circuit 17 and to set the counting period of the preset counter circuit 19.

The preset counter 19 starts to count output pulses of the clock-pulse generator 21 when an indicating signal is supplied to it from delay circuit 23.

After the counting period set by decimal-binary counting matrix 13, which is proportional to the binary output value, is completed, the preset counter circuit 19 provides a stopping signal for controlling power holding circuit 15, which consists of a modified flip-flop circuit designed to control power supply circuit 17. Being triggered by the output signals of channel selector circuit 11, the output of the power holding circuit 15 which has two voltage states becomes high level voltage state until said circuit 15 receives the stopping signal from the preset counter circuit 19, and the high level voltage state maintains the power supply circuit 17 to operate.

Being provided the stopping signal from the circuit 19, the output of the power holding circuit 15 becomes low level voltage state, and it maintains the power supply circuit 17 not to operate.

In order to operate the system with some delay after the channel selector circuit 11 has been activated so as to prevent undesired vibration or chattering, the delay circuit 23 is provided.

A pulse train from clock-pulse generator 21 is applied to a conventional gate circuit 25 which is controlled by the output signal of delay circuit 23. The output pulse train of gate circuit 25 activates the remote control signal generator 27 such as an oscillator which generates ultrasonic waves.

Before proceeding with a description of the operation of FIG. 2, it should be noted that a positive logic system is used for convenience of the explanation. A negative logic system could also be adapted for such use.

Assuming that the switch S3 of channel selection circuit 11 is turned on, the switch arm 10 is connected with a common earth terminal, biasing both diode D1 and diode D2 in that order. Accordingly, a DC current path exists from DC voltage source B+ biasing dividers R1, R2, and diode D2, a differential circuit and the diode D1, when switch S3 is released, switch arm 10 is connected with the DC voltage source B+ and diodes D1 and D2 are reversely biased which turns off the DC current path.

Figures 3A, 3B, 3C, 3D, 3E, 3F, 3G:
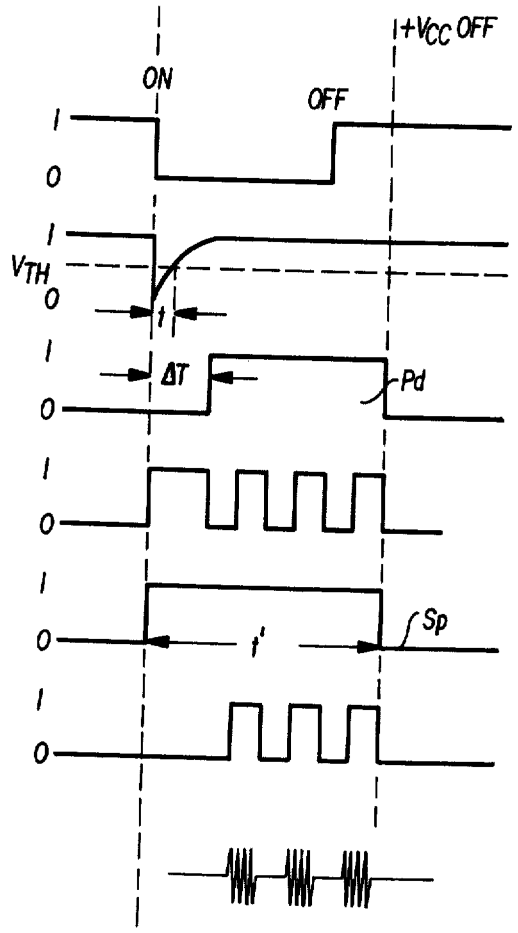
FIGS. 3A, 3B, 3C, 3D, 3E, 3F and 3G are graphical displays of operational wave forms related to specific points in the schematic circuit diagram shown in FIG. 2.

When switch S3 is in the closed position, a negative pulse is induced at the positive pole of the diode D1, shown in FIG. 3 (*a*) as binary 0. When switch S3 is open, a binary 1 condition exists. At the negative pole of the diode D2, a trigger signal FIG. 3 (*b*) which is sharper than the pulse shown in FIG. 3 (*a*), is derived because of the function of the differential circuit 29. The first transistor T1 is designed to operate under the threshold voltage Vth in FIG. 3 (*b*). With the help of biasing dividers R1, R2, transistor T1 is activated during the period of "*t*" and supplies DC current through the other divider R3, R4 activating transistor T2 which supplies DC voltage power (+Vcc) to all other circuits such as NAND circuits N1, N2, N3, and N4 in the channel selector circuit 11, the clock-pulse generator 21, the preset counter circuit 19, power holding circuit 17, delay circuit 23, and the gate circuit 25.

In order to keep DC voltage power supply to all circuits after one of the switches such as S3 is pressed, the power holding circuit 15 which consists of flip-flop circuit, is triggered by the same triggered pulse as shown in FIG. 3 (*b*) and keeps the transistor T3 activated so as to continue supplying DC voltage power until the stopping signal from preset counter 19 resets the flip-flop circuit again.

When the third switch S3 is closed under these power supplied conditions, a 0 pulse is applied to these NAND circuits $N_1$ and $N_2$, respectively, and consequently a 11 binary value, which is 3 in decimals, is added to preset terminals $U_1$ ($2^0$) and $U_2$ ($2^1$) of the preset counter in the form of a 1 pulse.

In this embodiment the preset counter 19 has only four preset terminals, $U_1$ ($2^0$), $U_2$ ($2^1$), $U_4$ ($2^2$) and $U_8$ ($2^3$) and can be preset up to 15 in decimals. However, it is to be understood that the number and capacity of the preset counter could be designed so as to meet functional requirements.

The output pulse 1 of the flip-flop circuit, which forms power holding circuit 15 is also applied to delay circuit 23, such as the pulse delay circuit which derives a delayed pulse as shown in FIG. 3 (*c*).

It is noted that the delaying period $\Delta T$ is determined by considering the period of chattering or unwanted vibration of the whole system which may occur just after the unit pulse is introduced when one of the switches is closed.

The delayed pulse $P_d$, FIG. 3 (*c*) activates the clock-pulse generator 21 for generating a clock-pulse as shown in FIG. 3 (*d*). This starts the preset counter 19 for commencing the number clock-pulses applied to counting terminal $H_2$ and the gate circuit 25 as a gate controlling signal. Such control is applied simultaneously for purposes of synchronization. The gate circuit 25 passes applied clock-pulses as long as the delayed signal continues as shown in FIG. 3 (*f*) so as to activate the remote control signal generator 27 in synchronization with the applied clock pulse.

FIG. 3 (*g*) shows synchronized discontinuous ultrasonic waves transmitted by said generator 27. When preset counter 19 counts out the preset binary value 11, as in the example above, it derives a stopping signal, $S_p$, as shown in FIG. 3 (*e*), which resets flip-flop circuit of the power holding circuit 15 and, in turn, disenergizes transistor $T_3$.

Consequently, the current path along the biasing divider $R_1$, $R_2$ is cut off and transistor $T_1$ and, subsequently, transistor $T_2$ become non-conducting, thus terminating the power supply to all of the circuits. It will be easily understood that, following a similar process, a pulse-train of ultrasonic waves, which has the number of pulses corresponding with the number of the switch selected in the channel selector circuit 11, will be transmitted by the remote controlling signal generator 27.

Figure 4:
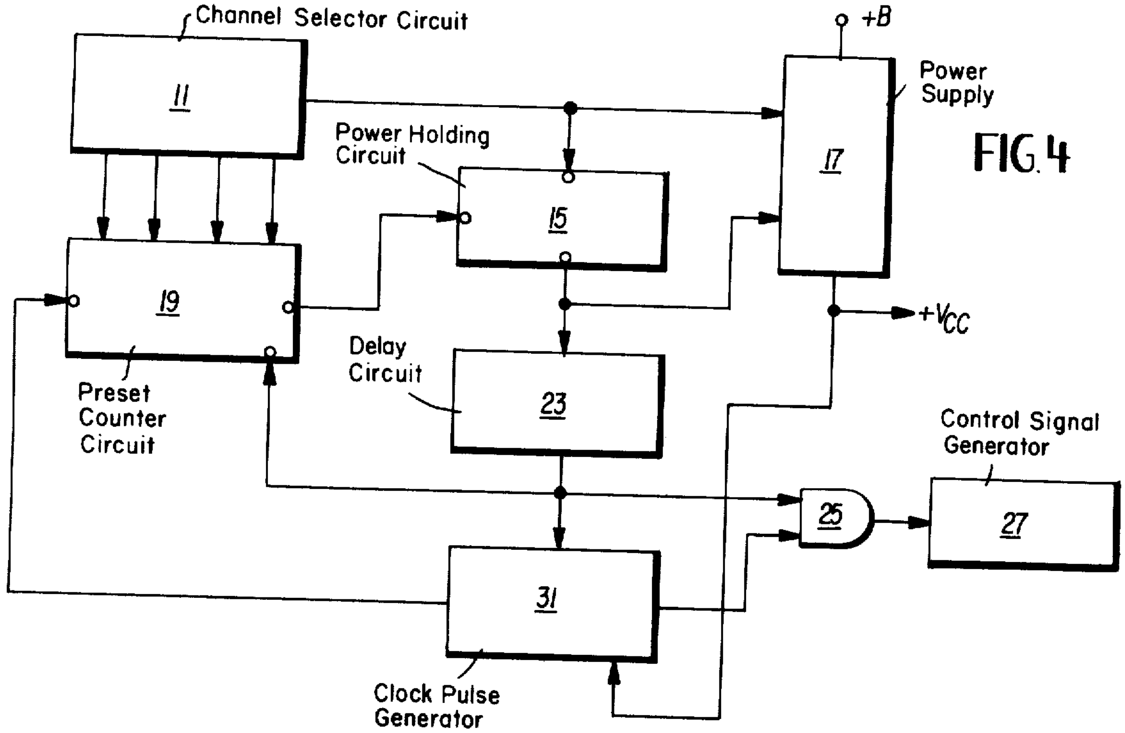
FIG. 4 is a schematic block diagram of another embodiment of the present invention.

FIG. 4 discloses a slight modification of FIG. 1. In this embodiment, the clock-pulse generator 31 consists of a free running multivibrator or other oscillator of the similar type which has a positive feedback circuit in which a gate circuit or AND circuit (not shown) is inserted and is controlled by the delay circuit 23, regardless of the power supplied condition. Such a multivibrator is well known and commercially available.

Figure 5:
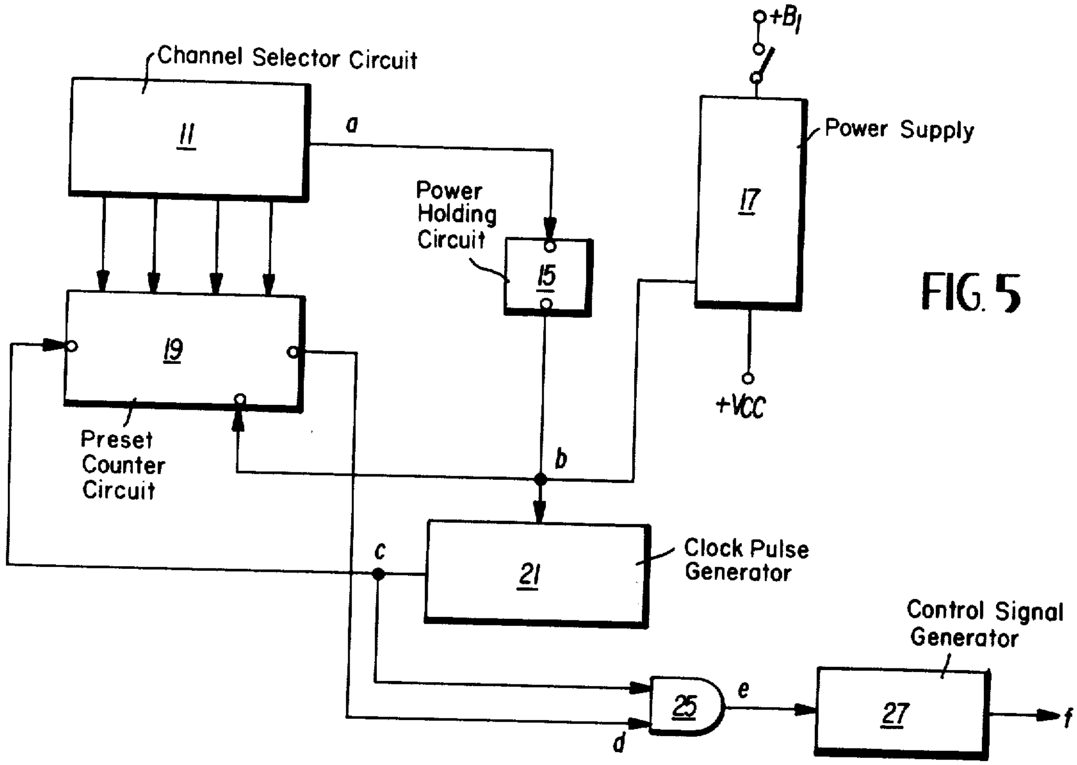
FIG. 5 is a schematic circuit diagram of a third embodiment of the present invention.
Figures 6A, 6B, 6C, 6D, 6E, 6F:
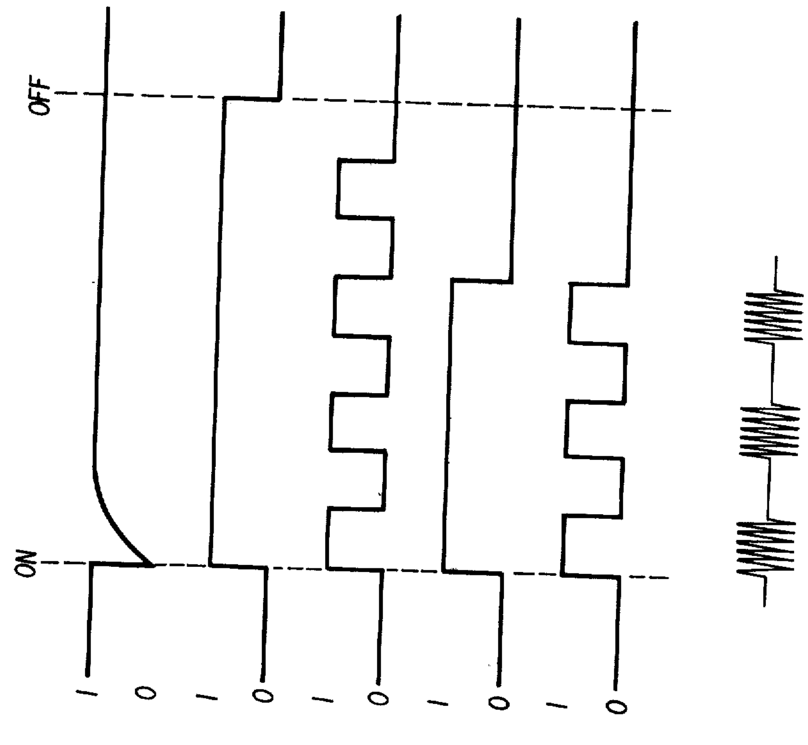
FIGS. 6A, 6B, 6C, 6D, 6E and 6F are graphical displays of operational wave forms related to the embodiment shown in FIG. 5.

FIG. 5 shows a block diagram of another embodiment of the present invention wherein the delay circuit 23 is omitted and the power holding circuit 15 is designed to be directly activated by the output signal of the channel selector circuit 11, and the gate circuit 25 is controlled by the stopping signal derived from the preset counter 19. In operation, when switch $S_3$ is activated (FIG. 2), as in the example mentioned above, a differential signal, as shown in FIG. 6 (*a*), of the pulse induced in the channel selector 11 triggers a flip-flop circuit of the power holding circuit 15 in turn applies a controlling signal, as shown in FIG. 6 (*b*), to the power supply circuit 17 supplying operational power (Vcc) to all of the circuits except power holding circuit 15. The function and operation of the preset counter 19 and the clock-pulse generator 21 are the same as previously described except that both of them are activated by the output pulse of the power holding circuit 15 instead of the delaying circuit 23, FIG. 2, and the stopping signal from the preset counter 19 controls the gate circuit 25, instead of the delay circuit 23. Operational wave forms at several parts of the block diagram in FIG. 5 are shown in FIG. 6.

Figure 7:
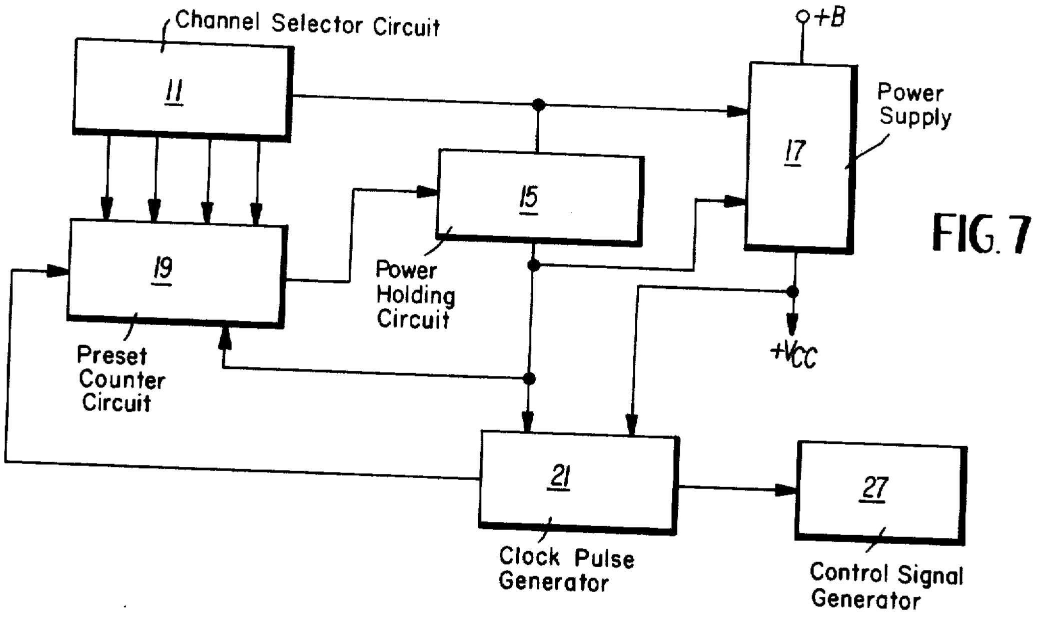
FIG. 7 is a schematic block diagram of a fourth embodiment of the present invention.
Figure 8:
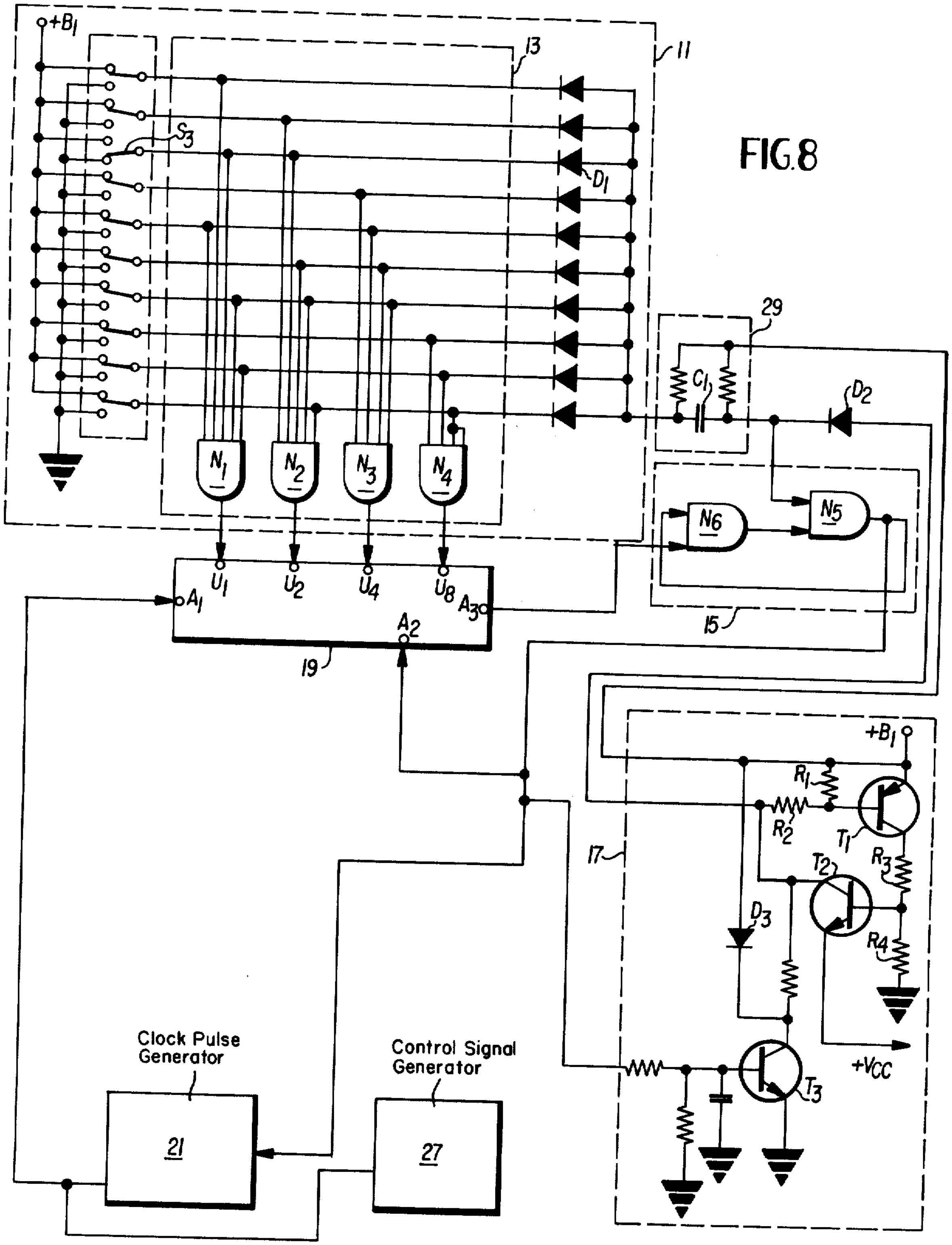
FIG. 8 is a schematic circuit diagram related to the embodiment of the present invention shown in FIG. 7.

The fourth embodiment of the present invention is disclosed in FIG. 7 as a circuit block diagram and in FIG. 8 as schematic circuit diagram in which both the delay circuit 23 and the gate circuit 25 are omitted.

Figures 9A, 9B, 9C, 9D, 9E, 9F:
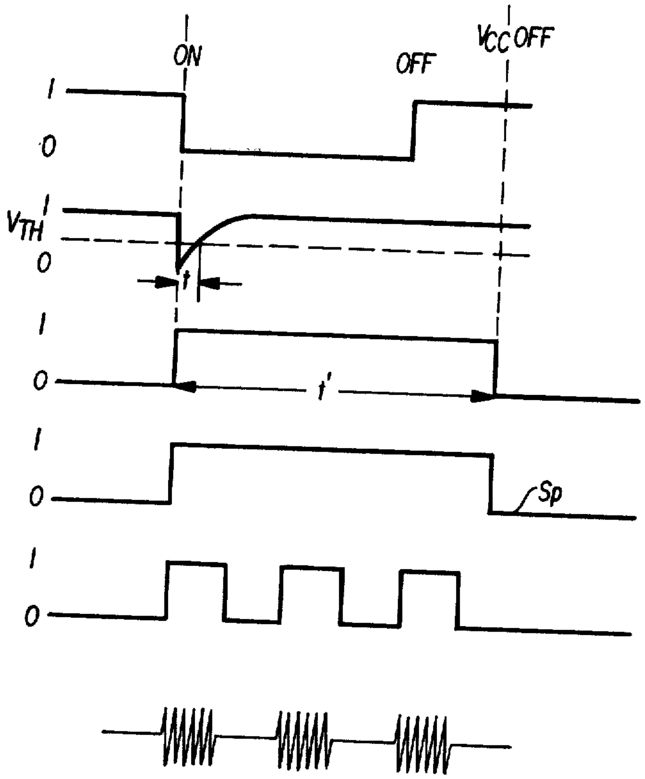
FIG. 9A, 9B, 9C, 9D, 9E and 9F are graphical displays operational wave forms related to the embodiment shown in FIG. 8.

The only exceptions in the operation are that both preset counter 19 and clock-pulse generator 21 are designed to be triggered by the output pulse from the flip-flop circuit forming power holding circuit 15 which, in turn, is triggered by the differential output pulse, as shown in FIG. 9 (*b*), FIG. 9 (*a*), induced by the channel selector 11, and is reset by the stopping signal $S_p$, FIG. 9 (*d*), received from the preset counter 19, when it has counted out the preset binary value.

Figure 10:
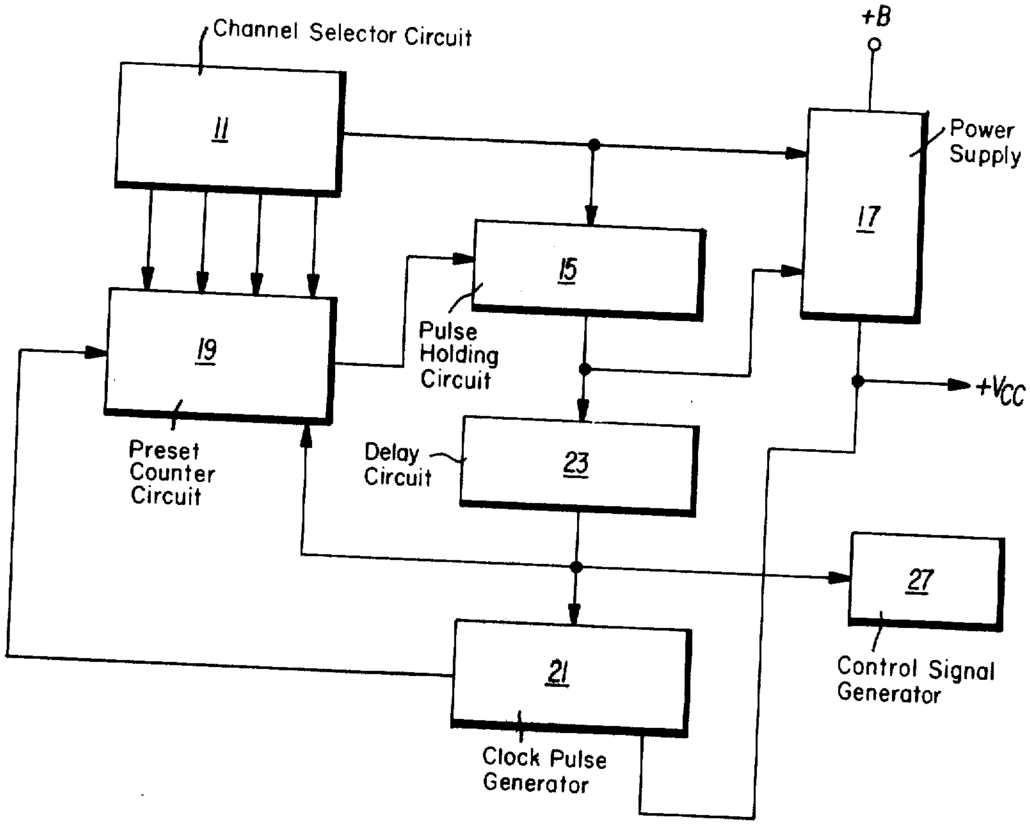
FIG. 10 is a schematic block diagram of a fifth embodiment of the present invention.
Figure 11:
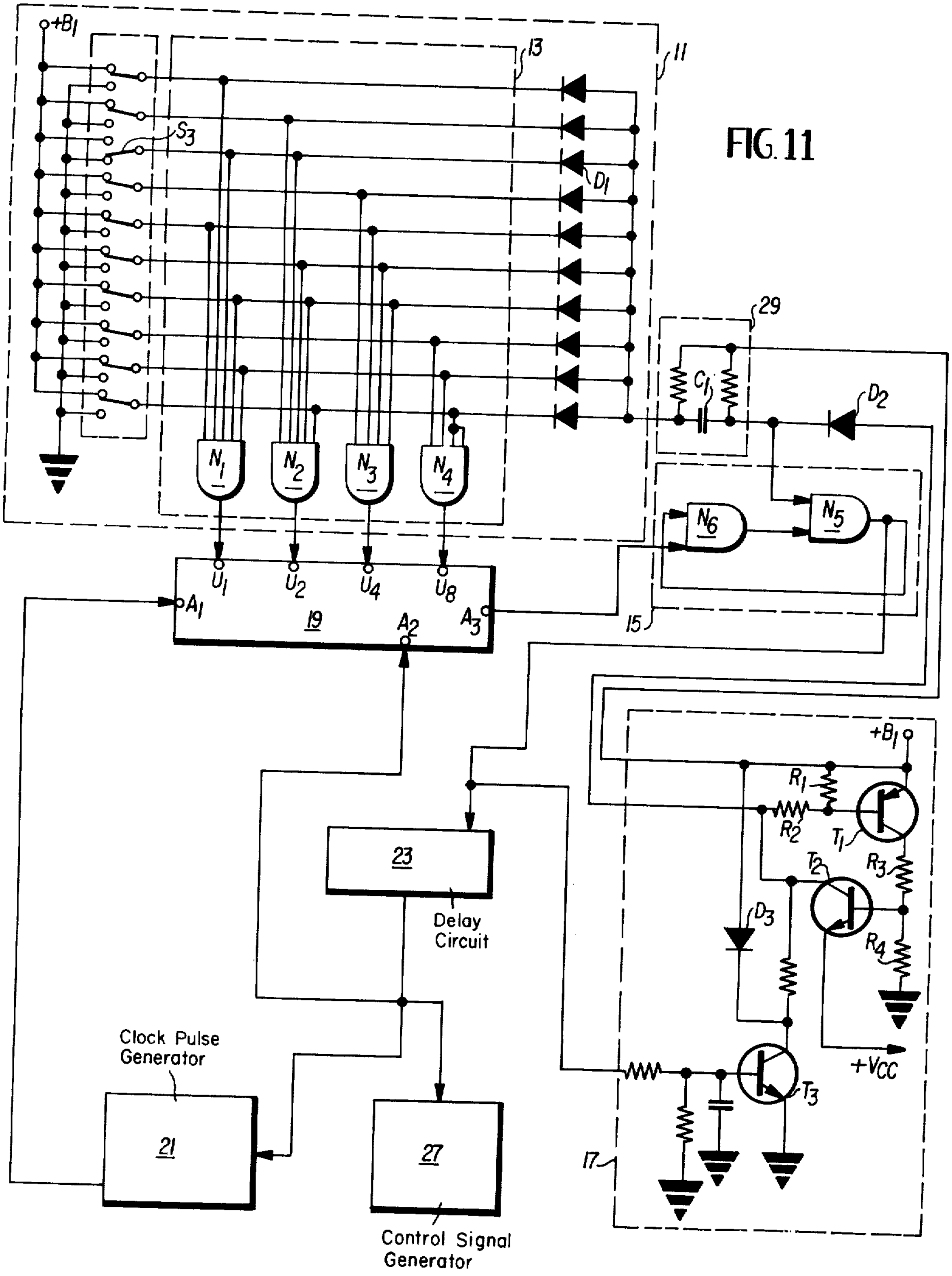
FIG. 11 is a schematic circuit diagram related to the embodiment shown in FIG. 10.

In this embodiment, clock-pulse generator 21 which is controlled by said power holding circuit 15, driver remote control signal generator 27 directly. The fifth embodiment of the present invention is shown in FIG. 10 in the form of a block diagram and in FIG. 11 in the form of a schematic circuit diagram.

Figures 12A, 12B, 12C, 12D, 12E, 12F:
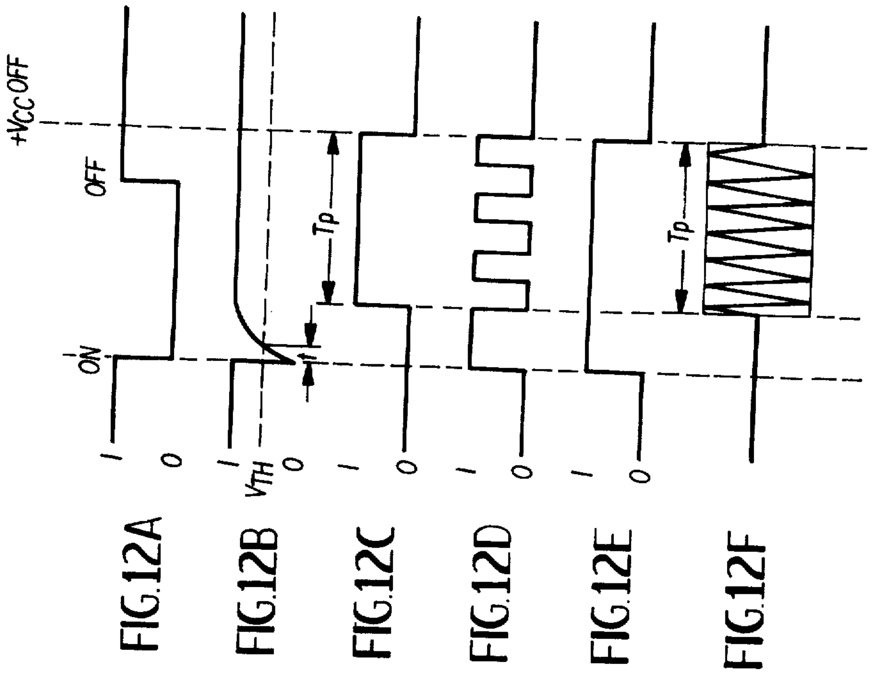
FIGS. 12A, 12B, 12C, 12D, 12E and 12F are graphical displays of operational wave forms related to the embodiment shown in FIG. 11.

The distinguishable feature of this embodiment is clearly shown in the FIG. 12 (*f*) which shows the continuous wave form of the remote controlling signal transmitter.

The period of the remote controlling signal is determined depending on the number of the switch selected in channel selector circuit 11. For this purpose the remote control signal generating circuit 27 is designed to be driven by the delay circuit 23 which delays the pulse derived at the power holding circuit 15 for a predetermined period.

The length $T_p$ of the output pulse at the delay circuit 23 as shown in FIG. 12 (*c*) varies depending on the individual selecting function in order to distinguish one remote controlling signal from another.

In this embodiment the length of each pulse mentioned above is designed such as shown in the following example.

When first switch is closed - $T_p$ = 30 m sec.
When second switch is closed - $T_p$ = 50 m sec.
When third switch is closed - $T_p$ = 70 m sec.

Figure 13:
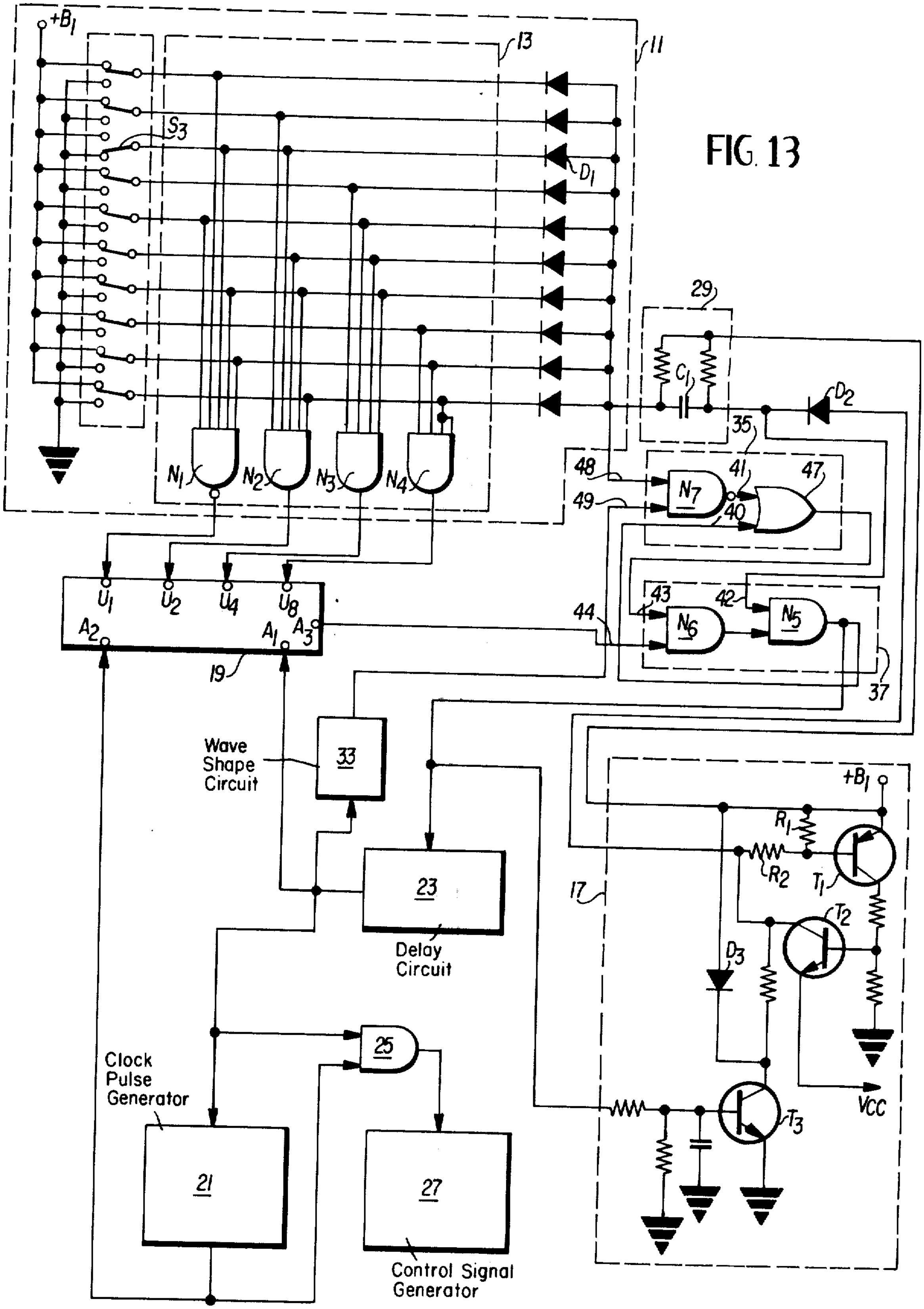
FIG. 13 is a schematic circuit diagram of a sixth embodiment of the present invention.

A schematic circuit diagram relating to a sixth embodiment of the present invention is disclosed in FIG. 13. This embodiment has a special feature for preventing misoperation of the signal generator caused by chattering noise at the time of activating and deactivating the switch in the channel selector circuit.

It should be noted that a wave shape circuit 33 is inserted between the delay circuit 23 and a comparison circuit 35 for preventing the chattering noise mentioned above.

The function of both wave shape circuit 33 and comparison circuit 35 will be fully understood from the following explanation of operation.

Figures 14A, 14B, 14C, 14D, 14E, 14F, 14G, 14H, 14I:
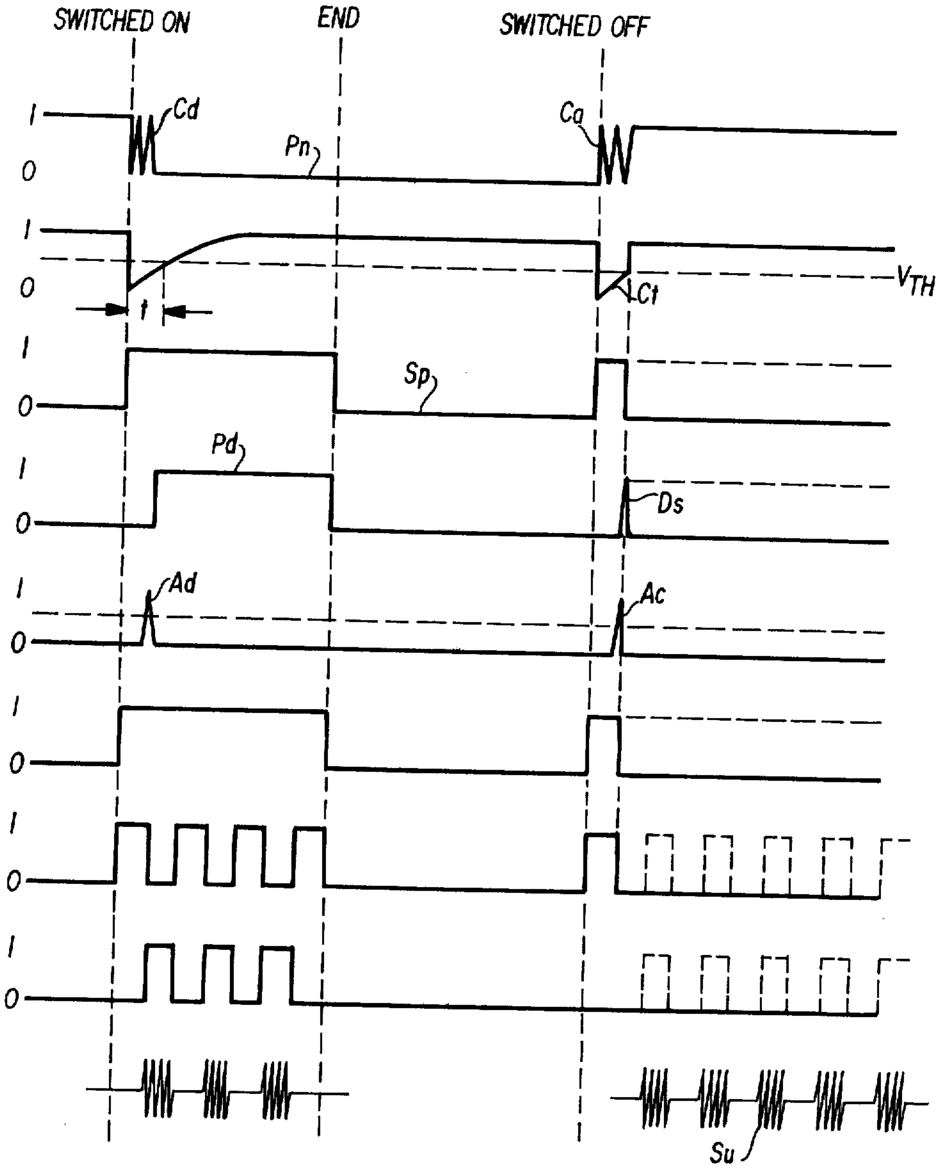
FIGS. 14A, 14B, 14C, 14D, 14E, 14F, 14G, 14H and 14I are graphical displays of operational wave forms related to the embodiment shown in FIG. 13.

In operation, when the third switch $S_3$ of the channel selector circuit is turned on, a pulse of negative polarity is induced at the positive pole of the diode $D_1$ as shown in FIG. 14 (*a*) in the same way as in FIG. 2, and at the negative pole of the diode $D_2$, a sharp pulse trigger is induced as a differential form of the pulse as shown in FIG. 14 (*b*).

The pulse trigger is then applied to the first terminal 42 of NAND circuit $N_5$ which forms a part of the flip-flop circuit 37.

During the period in which the pulse trigger falls down below the threshold level Vth, FIG. 14 (*b*), the input signal of the first terminal 42, of the NAND circuit $N_5$ maintains 0 and the output signal 1 is applied to the delay circuit 23 and to the second input terminal 40 of the AND gate 47 which forms a part of a comparison circuit 35.

On the other hand, when the continuous 0 pulse, which may contain chattering noises Cd as shown in FIGS. 14 (*a*), is applied to the first terminal 48 of the NAND circuit $N_7$ and, in addition, the input pulse signal at the second terminal 49 of the NAND circuit $N_7$ is kept 0 (except for the duration of the antichattering signal in FIG. 14 (*e*), which is expected to be applied to the terminal 49 from the wave shaping circuit 33) the logical output of the NAND circuit $N_7$ becomes 1. This output is applied to the first terminal 41 of the AND circuit 47 making its output 1 which is also the output of the comparison circuit 35. The output 1 is applied to the first terminal 43 of the NAND circuit $N_6$, which is a part of the flip-flop circuit 37. The second input signal applied to terminal 44 is kept 1 until the stopping signal, as shown in FIG. 14 (*c*) $S_p$, is applied thereto. Then the output 0 of the NAND circuit $N_6$ causes the output signal of NAND circuit $N_5$ to remain 1, whether the other input signal becomes 0 or 1.

The output signal 1 of the NAND circuit $N_5$ maintains the transistor $T_3$ conductive to complete a DC current path along DC power source (+B), biasing divider $R_1$, $R_2$, diode $D_3$ and the common earth terminal maintaining both transistor $T_1$ and $T_2$ also conductive thereby supplying DC power +Vcc to all of the circuits until the stopping signal from the preset counter 19 resets the flip-flop circuit 37.

As mentioned before, chattering noises are observed at the descending $C_d$ and the ascending $C_a$ parts of the pulse induced by the channel selector circuit, FIG. 14 (*a*) and these noises are differentiated by the differential circuit 29 which may possibly trigger the flip-flop circuit 37. In the event the whole signal generator misoperates so as to send unintentional signals as shown in dotted line in FIG. 14 (*g*) and (*h*), unintentional remote controlling signals, as shown in FIG. 14 (*i*) $S_u$, are transmitted to the TV set to be controlled remotely.

In order to prevent the misoperation mentioned above, the anti-chattering signal, which is the wave shaped signal of the ascending pulse at delay circuit 23 formed by the wave-shaping circuit 33, FIG. 14 (*e*), signal $A_c$ is applied to the second terminal 49 of the NAND circuit $N_7$. The operation will be more clearly understood by referring to the following explanation. When the triggering pulse $C_t$ caused by the chattering noise $C_n$ activates the flip-flop circuit 37, the power supply circuit operates in the manner described above. The pulse $C_t$ is also applied to the delay circuit 23 which derives a delayed signal $D_s$, which is, in turn, converted into the anti-chattering signal $A_c$ at the wave-shaping circuit 33.

The anti-chattering signal $A_c$ is applied to the second terminal 49 of the NAND circuit $N_7$ whose first terminal has an input of 1 when the switch S in the channel selector circuit 11 is in off position. Therefore, at the time when the signal level of the anti-chattering signal $A_c$ rises above threshold voltage Vth (1 in logic) the output signal of the NAND circuit $N_7$ becomes 0 which resets the flip-flop circuit 37 and subsequently controls the power supply circuit to stop supplying DC power to all the circuits in order to prevent possible misoperation. Although the anti-chattering signal $A_d$ is induced at the ascending position of the delaying pulse $P_d$ in normal operation, it should be noted that the pulse $P_n$, as 0 from the channel selector circuit 11, is applied to the first terminal 48 of the NAND circuit $N_7$ which makes a 1 output with or without the chattering signal at its second terminal 49 and no interferring problem will occur.

The above remote control device may be used with a television set which itself has individual switches for channel selection. One such set is produced by SANYO, Model No. 20-R802. Such a set has individual variable capacitors which correspond with each tuning circuit related to each television channel. The output signal of the present remote control device activates these tuning circuits.

It is to be understood that the above description and drawings are illustrative only since the various circuit components could be varied without departing from the invention. Accordingly, the invention is to be limited only by the scope of the following claims.

What is claimed is:

1. A remote control signal generator which operates in a manner so as to individually control a plurality of remote circuits comprising:

a. channel selector means including a plurality of selector switch means for producing a binary coded signal corresponding to a selected one of said selector switch means;

b. holding means actuated by said channel selector means;

c. clock pulse generating means, actuated by said holding means for generating a predetermined number of clock pulses;

d. power supply means coupled to said channel selector means and said holding means;

a. preset counting means coupled to said channel selector means such that the count set in said counting means corresponds to said binary coded signal, said counting means counting the number of pulses generated by said clock pulse generating means up to the count set by said channel selector means and providing a stopping signal to said holding means to control said clock pulse generating means when said preset count has been reached; and, f. control signal generator means, coupled to said clock pulse generating means and synchronized with the pulses generated by said clock pulse generating means for generating remote control signals to control said plurality of remote circuits.

2. The remote control signal generator of claim 1, wherein said holding means includes a holding circuit and delay means coupled to said clock pulse generator means for delaying the actuation of said clock pulse generator means for a predetermined period of time after the actuation of one of said switch means.

3. The remote control device of claim 2 wherein said holding circuit comprises a bistable circuit means said bistable circuit means switching from a first state to a second state upon actuation of one of said switch means and switching from said second state back to said first state upon the generation of said stopping signal.

4. The remote control signal generator of claim 2, wherein said control signal generator means includes a control signal generator circuit and gate means coupled to said clock pulse generator means and said delay means, said control signal generator circuit producing an output when said gate means is actuated by both said clock pulse generator means and said delay means.

5. A remote control signal generator which operates in a manner so as to individually control a plurality of remote circuits comprising:

a. channel selector means including a plurality of selector switch means for producing a binary coded signal corresponding to a selected one of said selector switch means;

b. holding means actuated by said channel selector means;

c. clock pulse generating means, actuated by said holding means for generating a predetermined number of clock pulses;

d. power supply means coupled to said channel selector means, said holding means and clock pulse generator means;

e. preset counting means coupled to said channel selector means such that the count set in said counting means corresponds to said binary coded signal, said counting means counting the number of pulses generated by said clock pulse generating means up to the count set by said channel selector means and providing a stopping signal to said holding means to control said clock pulse generating means when said preset count has been reached; and, f. control signal generator means, coupled to said clock pulse generating means and synchronized with the pulses generated by said clock pulse generating means for generating remote control signals to control said plurality of remote circuits.

6. The remote control signal generator of claim 5, wherein said holding means includes a holding circuit and delay means coupled to said clock pulse generator means for delaying the actuation of said clock pulse generator means for a predetermined period of time after the actuation of one of said switch means.

7. The remote control device of claim 6, wherein said holding circuit comprises a bistable circuit means said bistable circuit means switching from a first state to a second state upon actuation of one of said switch means and switching from said second state back to said first state upon the generation of said stopping signal.

8. The remote control signal generator of claim 6, wherein said control signal generator means includes a control signal generator circuit and gate means coupled to said clock pulse generator means and said delay means, said control signal generator circuit producing an output when said gate means is actuated by both said clock pulse generator means and said delay means.

9. The remote control signal generator of claim 5 wherein said holding means includes a holding circuit coupled directly to said clock pulse generating means for controlling the actuation thereof.

10. The remote control signal generator of claim 5, wherein said control signal generator means comprises a control signal generator circuit coupled directly to said clock pulse generator means.

11. A remote control signal generator which operates in a manner so as to individually control a plurality of remote circuits comprising:

a. channel selector means including a plurality of selector switch means for producing a binary coded signal corresponding to a selected one of said selector switch means;
b. holding means actuated by said channel selector means;
c. clock pulse generating means, actuated by said holding means for generating a predetermined number of clock pulses;
d. power supply means coupled to said clock pulse generating means;
e. preset counting means coupled to said channel selector means such that the count set in said counting means corresponds to said binary coded signal, said counting means counting the number of pulses generated by said clock pulse generating means up to the count set by said channel selector means; and,
f. control signal generator means, coupled to said clock pulse generating means and synchronized with the pulse generated by said clock pulse generating means for generating remote control signals to control said plurality of remote circuits.

12. The remote control signal generator of claim 11, wherein said holding means includes a holding circuit coupled directly to said clock pulse generating means for controlling the actuation thereof.

13. The remote control device of claim 12, wherein said holding circuit comprises a bistable circuit means said bistable circuit means switching from a first state to a second state upon actuation of one of said switch means and switching from said second state back to said first state upon the generation of said stopping signal.

14. The remote control signal generator of claim 10, wherein said control signal generator means includes a control signal generator circuit and gate means coupled to said clock pulse generator means and said preset counter means, said control signal generator circuit producing an output when said gate means is actuated by both said clock pulse generator and said preset counter.

15. A remote control signal generator which operates in a manner so as to individually control a plurality of remote circuits comprising:

a. channel selector means including a plurality of selector switch means for producing a binary coded signal corresponding to a selected one of said selector switch means;
b. clock pulse generator means for generating a predetermined number of pulses;
c. holding means for actuating said clock pulse generating means comprising a holding circuit and delay means coupled to said clock pulse generator means for delaying the actuation of said clock pulse generator means for a predetermined period of time after the actuation of one of said switch means;
d. waveshape means coupled to the output of said delay means for reforming the waveshape of the output of said delay means;
e. comparator means for comparing the output of said waveshape means and said channel selector means, the output of said comparator means being coupled to said holding means for controlling said holding means;
f. power supply means coupled to said channel selector means and said holding means;
preset counting means coupled to said channel selector means such that the count set in said counting means corresponds to said binary coded signal, said counting means counting the number of pulses generated by said clock pulse generating means up to the count set by said channel selector means and providing a stopping signal to said holding means to control said clock pulse generating means when said preset count has been reached; and,
h. control signal generator means, coupled to said clock pulse generating means and synchronized with the pulses generated by said clock pulse generating means for generating remote control signals to control said plurality of remote circuits.

16. A remote control signal generator of claim 15, wherein said control signal generator means includes a control signal generator circuit and gate means coupled to said clock pulse generator means and said delay means, said control signal generator circuit producing an output when said gate means is actuated by both said clock pulse generator means and said delay means.

17. The remote control device of claim 15 wherein said holding circuit comprises a bistable circuit means said bistable circuit means switching from a first state to a second state upon actuation of one of said switch means and switching from said second state back to said first state upon the generation of said stopping signal.

18. The remote control signal generator which operates in a manner so as to individually control a plurality of remote circuits comprising:

a. channel selector means including a plurality of selector switch means for producing a binary coded signal corresponding to a selected one of said selector switch means;

b. clock pulse generating means for generating a predetermined number of clock pulses;

c. holding means for actuating said clock pulse generating means actuated by said channel selector means including a holding circuit and delay means coupled to said clock pulse generator means for delaying the actuation of said clock pulse generator means for a predetermined period of time after the actuation of a one of said switch means;

d. power supply means coupled to said channel selector means, said holding means and said clock pulse generator means;

e. preset counting means coupled to said channel selector means such that the count set in said counting means corresponds to said binary coded signal, said counting means counting the number of pulses generated by said clock pulse generating means up to the count set by said channel selector means and providing a stopping signal to said holding means to control said clock pulse generating means when said preset count has been reached;

f. control signal generator means, coupled to said delay means for generating remote control signals to control said plurality of remote control circuits.

19. The remote control device of claim 18, wherein said holding circuit comprises a bistable circuit means said bistable circuit means switching from a first state to a second state upon actuation of one of said switch means and switching from said second state back to said first state upon the generation of said stopping signal.

* * * * *